United States Patent

Pitchon

[15] 3,653,910
[45] Apr. 4, 1972

[54] PROCESS FOR OBTAINING COFFEE AROMATICS

[72] Inventor: Esra Pitchon, Flushing, N.Y.
[73] Assignee: General Foods Corporation, White Plains, N.Y.
[22] Filed: Dec. 5, 1969
[21] Appl. No.: 882,708

[52] U.S. Cl. .................................................99/71, 99/65
[51] Int. Cl. ..............................................A23f 1/08
[58] Field of Search .................................99/65, 71

[56] References Cited

UNITED STATES PATENTS

| | | | |
|---|---|---|---|
| 2,432,759 | 12/1947 | Heyman | 99/71 |
| 3,244,531 | 4/1966 | Clinton et al. | 99/71 |
| 3,476,566 | 11/1969 | White et al. | 99/65 |
| 3,421,901 | 1/1969 | Mahlmann et al. | 99/71 |

Primary Examiner—Frank W. Lutter
Assistant Examiner—William L. Mentlik
Attorney—Gerald E. Jacobs, Bruno P. Struzzi and Thomas V. Sullivan

[57] ABSTRACT

By introducing steam into a bed of coffee to obtain steam distilled aromatics, the base extract obtained by extraction of the steamed coffee is more acid, and less desirable than extract obtained from unsteamed coffee. In the process of this invention, the steam is made to flow from the top of the bed of coffee, down through the bed. It was discovered that the extract obtained by extraction of coffee subjected to downflow steaming was less acidic and less degraded than extracts obtained from coffee treated with normal upflow of steam.

1 Claims, No Drawings

PROCESS FOR OBTAINING COFFEE AROMATICS

BACKGROUND OF THE INVENTION

This invention concerns an improved method for obtaining coffee aromatics via the technique of steaming roasted and ground coffee. More particularly, it pertains to an improved steaming process which, after extraction of the steam coffee, yields an extract which is less degraded and more desirable than extracts obtained via prior art processes.

There are many different processes known to those skilled in the art for obtaining volatile aromatics from roasted and ground coffee via steam distillation. Thus, in U.S. Pat. No. 3,421,901 a technique for steaming coffee under atmospheric conditions to release aromatic vapors is described and claimed. In column 2, lines 35 through 55, it will be noted that while operating parameters for critical variables are specified, the standard technique of introducing steam at the lower portion of a column of coffee is described. The standard technique of introducing steam into a bed of coffee in other prior art processes is to pass the steam up through the coffee, from the bottom of the bed to the top of the bed. This upward flow of steam is used in processes that call for continuous draw-off of steam from the coffee at atmospheric conditions or under vacuum. Up-flow is also used in processes where the bed of coffee is isolated under pressure prior to drawing off the steam and aromatic vapors from the coffee.

It is a well known fact that extract obtained via extraction of steamed coffee is undesirably acidic. In U.S. Pat. No. 3,420,674, prior art process for deacidifying extract are described and a new technique of removing deleterious acid components from steamed coffee prior to extraction is disclosed and claimed. Also, in co-pending application Ser. No. 878,227 filed Nov. 19, 1969 entitled Process for Removing Deleterious Acid Components from Steamed Coffee, a new technique for using unsteamed coffee to deacidify extract obtained from steamed coffee is disclosed and claimed.

It is readily apparent, that those skilled in the art recognize that steaming roasted and ground coffee results in the production of undesirable acids which degrade the quality of coffee extract obtained when extracting the steamed, roasted and ground coffees.

SUMMARY OF THE INVENTION

It has now been discovered that by causing the steam to flow in a downward direction through a bed of roasted and ground coffee the production of undesirable acids is significantly minimized. By utilizing downflow steaming in the prior art processes for obtaining aromatic volatiles from coffee, it is possible to then extract soluble solids from the steamed coffee and obtain an extract which has little, if any, of the undesirable green-acid-sour flavor associated with extracts obtained when utilizing the prior art steaming processes.

It is most significant, that the simple technique of reversing the direction of the flow of the steam, results in a marked improvement in the quality of the extract obtained from steamed coffee. Surprisingly, the desirable effect of downflow steaming results in improved quality extracts in essentially all of the known prior art processes for steam stripping aromatic volatiles from roasted and ground coffee.

DESCRIPTION OF THE PREFERRED EMBODIMENT

The process of this invention is an improvement in prior art processes of removing aromatic volatiles from roasted and ground coffee by steam distillation. It is applicable to processes wherein a column is filled with a bed of coffee prior to steaming. The improvement comprises passing steam through the coffee in a downward direction, rather than the normal upward flow of steam used in the prior art processes.

The process of this invention is intended to yield aromatic volatiles which are equivalent to those obtained when using a standard upflow steaming technique. The advantage of this process is that the extract obtained when the steamed coffee is extracted does not have the undesirable green-acid-sour flavor normally associated with extracts obtained from steamed coffee.

It is believed that when steam is passed in an upward direction through a bed of coffee, condensate tends to form at the bottom of the bed. This condensate then has to be boiled off by incoming steam in order to drive aromatic vapors to the outlet at the top of the bed. Thus, there is a refluxing action within the column when using an upward flow of steam and it is this refluxing which probably causes the formation of undesirable acids. By using the process of this invention and introducing the steam at the top of the column the refluxing is essentially eliminated and the production of undesirable acids is thereby minimized.

It may be possible, in practicing the process of this invention, to utilize lower steam pressures then are necessary in the prior art processes. However, the major significance of this invention is that the simple technique of using downflow steaming results in a marked improvement in the quality of extract obtained from the steamed coffee when utilizing well defined processes of the prior art.

In practicing the process of this invention, the roasted and ground coffee is preferably loaded into a vessel wherein the height of the bed of coffee is at least two or three times the width of the bed. The vessel used for steaming is preferably a percolator column which would then be placed on stream in a standard extraction operation utilizing a set of percolators. By using the percolator column as the vessel in which the steaming operation is performed, additional material handling of the steaming coffee prior to percolation is avoided and the overall process is therefore simpler.

The process of this invention will be further described and understood by reference to the following examples:

EXAMPLE I

A 5 inch diameter by 60 inch long percolator column was filled with 8.0 Kg. of roasted and ground coffee. Steam at 20 p.s.i.g. was introduced into the bottom of the percolator with a top vent valve open. The gases and vapors leaving the top of the percolator were sent to a condenser using a coolant at 35° F. When 400 ml of condensate was collected the steam valve at the bottom of the column and the vent valve at the top of the column were shut off thereby isolating the column. The percolator was then put on stream as the fresh stage of a standard 6 column percolator set. Second stage extract was introduced into the bottom of this column and 13.0 Kg. of extract was withdrawn in the conventional manner from the top of the column. The 400 ml of condensate was added to the extract and the mixture was spray dried under relatively mild conditions (i.e. low inlet air temperature conditions). The resultant soluble coffee produces a beverage which had strong, brewed-coffee-like flavor. However, the beverage had an undesirably green-sour flavor.

EXAMPLE II

The process of Example I was repeated with the following modification: Steam was introduced at the top of the column and the gases and vapors were drawn off at the bottom of the column. The resultant soluble coffee produced a beverage with the same desirable brewed coffee-like flavor attributed to the aromatic condensate added to the extract. Advantageously, the green-sour notes found when using upflow steaming (Example I) were not present in the product produced via the improved process of this invention (downflow steaming).

EXAMPLE III

A 5 inch diameter by 60 inch percolator was filled with 8 Kg. of roasted and ground coffee. Steam at 90 p.s.i.g. was introduced into the bottom of the percolator column with the top vent valve open. When the temperature of the vapors leaving the top of the column reached 200° F the top vent valve was shut off, thereby isolating the top of the column, and pressure in the percolator was allowed to rise to 20 p.s.i.g. which point the steam entering the column was shut off thereby isolating the bottom of the column. The percolator was held under pressure for two minutes and the top vent valve was then opened. The pressure in the column caused aromatic vapors to flow from the column. These vapors were passed to a condenser using a coolant at 35° F. Approximately 200 ml of aromatic condensate was collected. The percolator column was then put on stream as the fresh stage in a percolator set of six columns and 13 Kg. of extract was withdrawn from the top of the column in a conventional manner. The 200 ml of aromatic condensate was added to the extract and the mixture was spray dried under gentle conditions. The resultant soluble coffee when prepared as a beverage resulted in a beverage with brewed coffee-like flavor but with flavor characteristics somewhat different than the product obtained in Example I. However, again there was an undesirable green-sour flavor note.

EXAMPLE IV

Example III was repeated, but the steam was introduced at the top of the column and gases were vented out of the bottom of the column. After the column had been held under pressure, the aromatic vapors were withdrawn from the bottom of the column. It was again found that the beverage prepared from the soluble coffee of this process had the desirable coffee-like flavor but the harsh green-sour notes observed in Example III were absent.

The foregoing examples were intended for illustrative purposes only and the invention is intended to be limited by the appended claims.

What is claimed is:

1. An improved process for obtaining an aromatized soluble coffee from roasted coffee comprising:
   a. filling a fresh stage percolator column of a standard percolator set with roasted and ground coffee wherein the height of the bed of coffee is at least two times the width of the bed;
   b. passing steam through the column of coffee, the steam flowing from the top of said column to the bottom of said column, whereby air in the column is displaced with steam by allowing the air to flow out the bottom of the column as the steam is introduced;
   c. isolating the bottom of the column when the air has been displaced, building up a pressure in the column by continued addition of steam into said column, said steam contacting the coffee in the column and causing aromatic volatiles to be released from said coffee; and
   d. isolating the top of the column;
   e. maintaining the column under pressure for from 1 to 10 minutes, the temperature of the coffee in the column being sufficiently high to prevent condensation of the steam;
   f. opening the bottom of the column to permit water vapor and aromatic volatiles to flow out the bottom of the column;
   g. collecting the released aromatic volatiles by condensing the mixture of water vapor and aromatic volatiles at a condenser temperature of less than 120° F;
   h. extracting the steamed coffee by introducing second stage extract into the bottom of the fresh stage percolator column to obtain a coffee extract;
   i. adding the aromatic volatiles to the extract; and
   j. drying the aromatized extract.

* * * * *